(No Model.) 3 Sheets—Sheet 1.

W. R. KINNEAR.
METAL CORNICE.

No. 443,322. Patented Dec. 23, 1890.

WITNESSES
Charley W. Hornor
H. L. Murdock

INVENTOR
William R. Kinnear
per Murdock & Murdock
Attorneys (No Model.) 3 Sheets—Sheet 2.
W. R. KINNEAR.
METAL CORNICE.
No. 443,322. Patented Dec. 23, 1890.
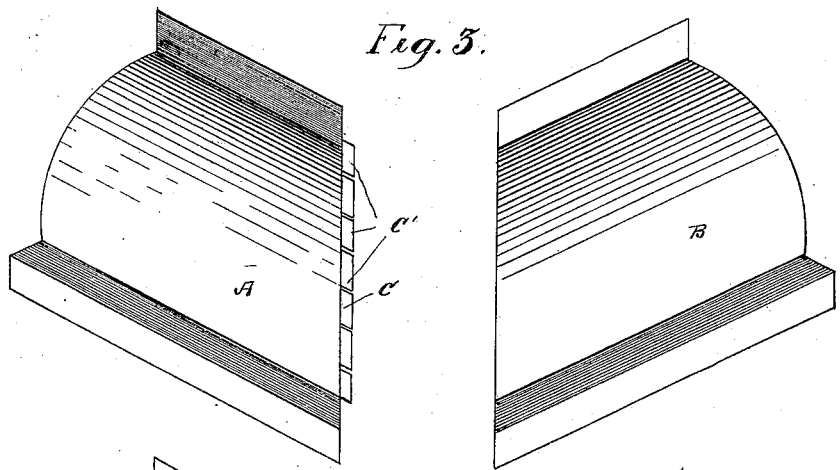
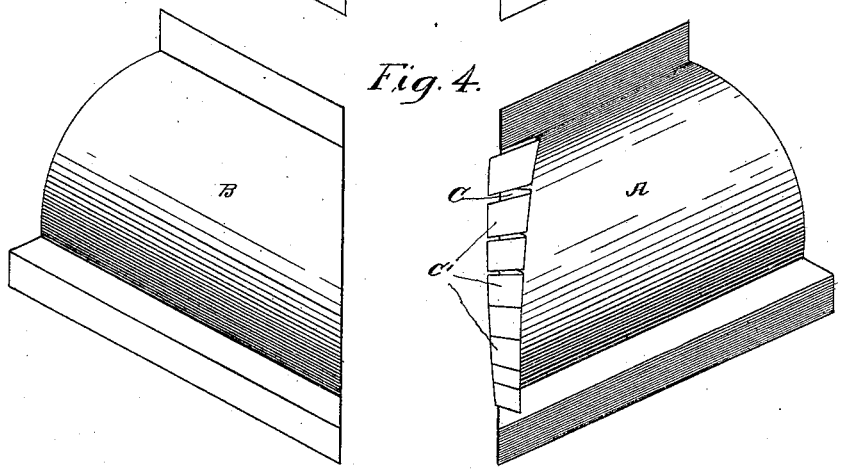
WITNESSES
INVENTOR
William R. Kinnear
per. Murdock & Murdock
Attorneys (No Model.) 3 Sheets—Sheet 3.
W. R. KINNEAR.
METAL CORNICE.
No. 443,322. Patented Dec. 23, 1890.
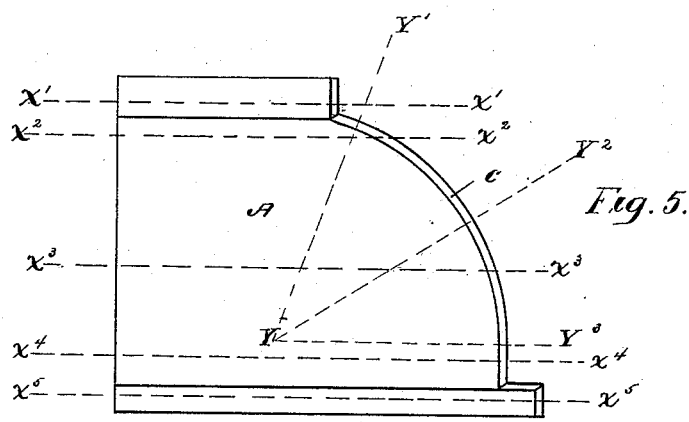
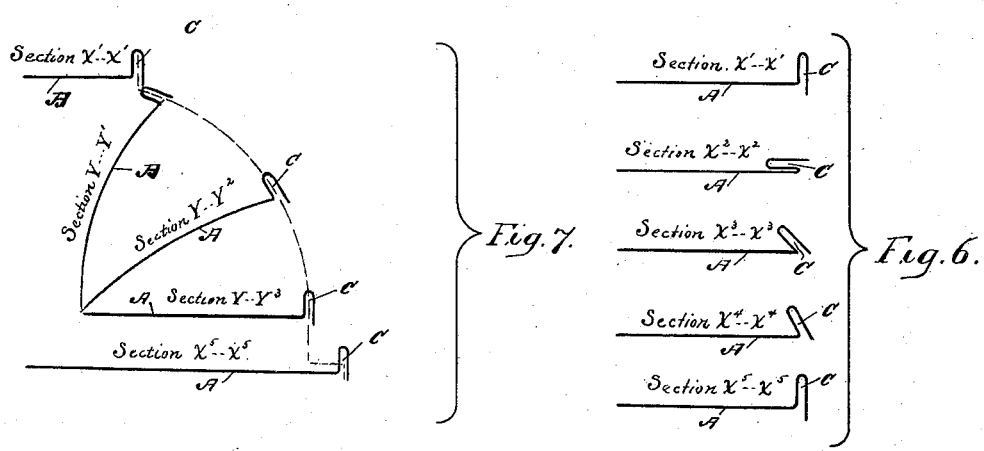
WITNESSES
INVENTOR
William R. Kinnear
per Murdock & Murdock
Attorneys

UNITED STATES PATENT OFFICE.

WILLIAM R. KINNEAR, OF COLUMBUS, OHIO.

METAL CORNICE.

SPECIFICATION forming part of Letters Patent No. 443,322, dated December 23, 1890.

Application filed February 27, 1890. Serial No. 342,021. (No model.)

*To all whom it may concern:*

Be it known that I, WILLIAM R. KINNEAR, a citizen of the United States, and a resident of Columbus, in the county of Franklin and State of Ohio, have invented new and useful Improvements in Metal Cornices; and I do hereby declare the following to be a full, clear, and exact description of the same, reference being had to the accompanying drawings, forming a part of this specification, and to the letters of reference marked thereon.

This invention relates to improvements in metal cornices, and more especially to the miters used therein.

This cornice is constructed from sheet metal and in short lengths. At the angles of the structure to which the cornice is being applied the ends of the lengths which form the angles are cut as required and joined to form what is termed a "miter." Heretofore these miters have been constructed by cutting the meeting ends as above mentioned and joining them rigidly. This has usually been accomplished by placing small clips or straps around the corner to the rear and soldering them to the abutting pieces, the solder being used freely to fill the joint formed by the meeting edges. This construction has many objections, among which are, first, the impossibility of changing the angle of the miter when formed to meet any variance in the structure to which it is being applied without completely reconstructing the whole miter; second, the increased bulk which the completed miter occupies in shipping when constructed at a factory removed from the place where the work is to be executed; third, the liability of the joint to be torn apart by the contracting of the metal forming the miter, and, fourth, the great care and labor which it is necessary to employ to form the completed miter.

It is the object of this invention to obviate the above-mentioned objections by the use of the miter shown in the accompanying drawings, in which—

Figure 1:
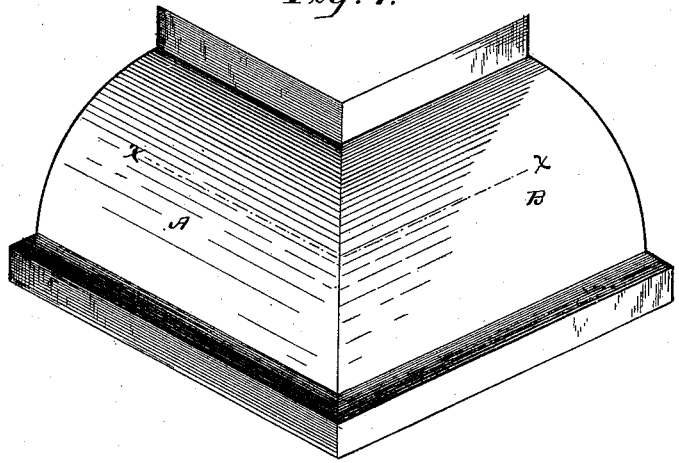
Figure 2:
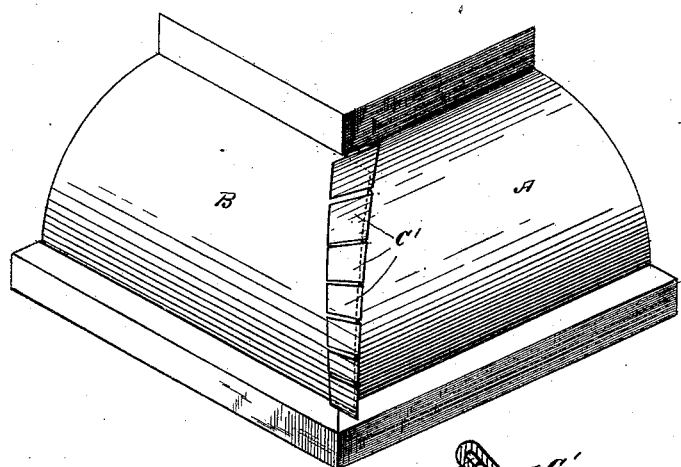
Figure 3:
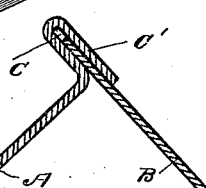

Figure 1 is a perspective view of the front of a miter constructed in accordance with this invention. Fig. 2 is a perspective view of the rear of the same. Fig. 3 is a perspective view from the front of the pieces forming the miter separated and in position to be joined. Fig. 4 is a perspective view of the same from the rear. Fig. 5 is a front elevation of the female section of this miter. Fig. 6 is a view of the serial sections cut on the lines $x'\ x'$, $x^2\ x^2$, $x^3\ x^3$, $x^4\ x^4$, and $x^5\ x^5$ in Fig. 5. Fig. 7 is a view of the serial sections $y\ y'$, $y\ y^2$, $y\ y^3$, $x'\ x'$, and $x^5\ x^5$ in Fig. 5. Fig. 8 is a section taken through line $x\ x$ in Fig. 1 to show the construction of the joined ends and their relative positions.

The letter A designates in the drawings the female section of the miter, and the letter B the male section of the same. The meeting edge of the female section is provided with the channel C. This channel is formed by returning the metal on itself to form the hook-edge shown by the sections at Fig. 7 of drawings. To accomplish this it is necessary to clip the end to form small sections $C'$, which will overlap each other when the channel is being formed and allow for the crowding and spreading of the metal forming the back of the channel, as shown at Figs. 2 and 4 of drawings. It is deemed advantageous to the manipulation of the sections in forming the miters that the male section should enter the channel in a straight line or common direction. To accommodate this feature, the channel is twisted or given a spiral direction, forming at the points indicated the sections shown at Fig. 6, when taken on parallel lines, as in Fig. 5. This spiral formation of the channel presents straight openings for the parts of the male section B to enter, forming, as it does, at each point the channel set back at an angle from the female section in line with the meeting portion of the male, as shown at Fig. 7 of drawings. In this figure are shown sections which are taken on lines emanating from the center, from which the curve of the cove of the male section is struck for the purpose of showing the formation of the channel at different points where the male section is introduced. The dotted lines are given to show the conformation of the male section in relation to the parts of the channel, as shown. In this way is formed upon the one section of a miter a groove or channel which corresponds to the profile of the other section, whereby the two sections may be joined and held together.

The sections being constructed as above described, the miters are formed as the cornice of which it forms a part is being applied to the structure. This is done by securing the female section A in position. The male section B is then adjusted by introducing the cut end into the channel C and in turn securing it in position. These sections are secured by the use of any desirable means. It will be observed that by the use of this miter when there is any variance in the structure above mentioned the two sections may be spread to accommodate the lines of the miter to those of the building without necessitating an entire reconstruction of the miter, as the joint formed by the channel C and end of the male section is not rigid; also, when crated for shipment the sections will nest closely and occupy, in consequence, but little room. Further, the sections being joined by a loose connection and not held rigidly, when the metal contracts there will be a slight movement in the joint to compensate for the contraction of metal forming the miter; and, again, the labor and care incident to the formation of the miter heretofore in use are largely dissipated by the use of this miter.

While I have herein described and shown the channel C as continuous, this could be changed by forming segments of this channel, which would produce an effect similar to the use of the continuous channel, though less efficient, and it will be understood that such a construction is comprehended by me in the use of the word "channel" in this specification and in the following claims.

What I claim is—

1. In a metal cornice and in the miter thereof, the combination of two sections formed to the desired profile and one being provided on its meeting end with a channel or groove opening throughout its length on the line of the profile of the abutting section to receive the end of the said section, substantially as described.

2. In a metal cornice and in the miter thereof, the combination of two sections, the one being provided with a groove or channel composed of segments adapted to receive the end of the other section, substantially as set forth.

WILLIAM R. KINNEAR.

Witnesses:
A. N. VAN DEMAN,
M. C. KINNEAR.